United States Patent [19]

Thomson et al.

[11] Patent Number: 5,408,953

[45] Date of Patent: Apr. 25, 1995

[54] APPARATUS FOR INCREASING THE SIZE OF AMMONIUM SULFATE CRYSTALS

[75] Inventors: Walter G. Thomson, Hitchcock, Tex.; Jonathan K. Kramer, Wayne, N.J.

[73] Assignee: BASF Corporation, Parsippany, N.J.

[21] Appl. No.: 232,556

[22] Filed: Apr. 25, 1994

Related U.S. Application Data

[60] Division of Ser. No. 825,739, Jan. 27, 1992, Pat. No. 5,330,544, which is a continuation-in-part of Ser. No. 574,205, Aug. 28, 1990, abandoned.

[51] Int. Cl.$^6$ ............................................. C30B 35/00
[52] U.S. Cl. .................................... 117/206; 117/925; 23/313 FB; 422/139
[58] Field of Search ................. 34/209, 210; 117/200, 117/201, 204, 206, 925; 159/45, 48.1; 422/245.1, 139, 140; 23/313 FB

[56] References Cited

U.S. PATENT DOCUMENTS

| | | | |
|---|---|---|---|
| 1,266,212 | 5/1918 | Capron . | |
| 1,919,707 | 7/1933 | Adam et al. . | |
| 2,043,067 | 6/1936 | Rumscheidt et al. | 23/119 |
| 2,092,073 | 9/1937 | Jeltsch et al. | 23/119 |
| 2,099,079 | 11/1937 | Rumscheidt et al. | 23/119 |
| 2,102,107 | 12/1937 | Berkhoff, Jr. | 23/119 |
| 2,178,082 | 10/1939 | Ravner | 23/119 |
| 2,226,101 | 12/1940 | Ogden | 23/119 |
| 2,228,742 | 1/1941 | Applebey | 23/119 |
| 2,368,901 | 2/1945 | Tiddy | 23/119 |
| 2,423,794 | 7/1947 | Otto | 23/119 |
| 2,424,207 | 7/1947 | Otto | 23/119 |
| 2,599,067 | 6/1952 | Otto | 23/119 |
| 2,631,843 | 3/1953 | Robinson | 23/119 |
| 2,659,659 | 11/1953 | Schmidl | 23/119 |
| 2,782,097 | 2/1957 | Costolow | 23/119 |
| 2,795,487 | 6/1957 | Otto | 23/273 |
| 2,805,125 | 9/1957 | Ackeren | 23/119 |
| 2,874,028 | 2/1958 | Ponchaud | 23/119 |
| 2,895,800 | 7/1959 | Otto | 23/119 |
| 3,600,818 | 8/1971 | Lang | 34/10 |
| 3,794,099 | 2/1974 | Ganiaris | 159/48 R |
| 4,057,396 | 11/1977 | Matovich | 23/252 R |
| 4,141,316 | 2/1979 | Grun | 118/303 |
| 4,242,307 | 12/1980 | Fally | 117/204 |
| 4,277,253 | 7/1981 | Walter et al. | 23/313 R |
| 4,332,933 | 6/1982 | DiDrusco et al. | 422/139 |
| 4,435,341 | 3/1984 | Bechtold | 264/7 |
| 4,698,913 | 10/1987 | Voll | 34/10 |
| 4,741,807 | 5/1988 | Wilhelm et al. | 196/14.52 |
| 4,859,315 | 8/1989 | Bartholic | 208/153 |
| 5,032,143 | 7/1991 | Ritakallio | 23/313 |
| 5,075,138 | 12/1991 | Tanaka et al. | 427/213 |
| 5,120,345 | 6/1992 | Kayaert et al. | 71/30 |

FOREIGN PATENT DOCUMENTS 61-256917 11/1986 Japan .
62-46920 2/1987 Japan .
1381480 1/1975 United Kingdom .

OTHER PUBLICATIONS

Parkash, "Residence Times of Crystals in a Fluidised Bed Crystallizer", *Chemistry and Industry*, pp. 919–920.
Parkash et al., "Crystal Growth in Fluidized Beds", *Indian Chemical Engineer*, Jan. 1968, pp. 3–6.
Vragov, "Investigation of Ammonium Sulfate Crystallization In a Pseudo Liquified Layer", *Sb. Nauch, Tr., Kuzbas, Politekh. Int.*, No. 26, 1970.
Postnikov et al., "Crystallization of Ammonium Sulfate in a Two-Circuit Device with a Circulating Suspension", *Koksii Khimiya*, No. 4, 1983, pp. 24–27.

*Primary Examiner*—R. Bruce Breneman
*Assistant Examiner*—FeLisa Garrett

[57] ABSTRACT

The average size of ammonium sulfate crystals is increased by passing undersized ammonium sulfate crystals through a multistage apparatus in which the crystals are contacted with an aqueous ammonium sulfate spray in a first heated chamber to increase the average size of the crystals, the enlarged crystals thereafter passing through a second heated chamber to dry the enlarged crystals.

11 Claims, 1 Drawing Sheet

APPARATUS FOR INCREASING THE SIZE OF AMMONIUM SULFATE CRYSTALS

This is a divisional of application Ser. No. 07/825,739, filed on Jan. 27, 1992, now U.S. Pat. No. 5,330,544, which is a continuation-in-part of Ser. No. 07/574,205, filed Aug. 28, 1990, abandoned.

BACKGROUND OF THE INVENTION

This invention relates to a process and apparatus for increasing the size of ammonium sulfate crystals, e.g., from an average size of about 0.5 mm to an average size of at least about 1.0 mm.

The manufacture of ammonium sulfate is an important industrial process and is the subject of a considerable body of patent and non-patent literature. See, e.g., U.S. Pat. Nos. 1,266,212; 1,919,707; 2,043,067; 2,092,073; 2,099,079; 2,102,107; 2,178,082; 2,226,101; 2,228,742; 2,368,901; 2,423,794; 2,424,207;. 2,599,067; 2,631,084; 2,659,659; 2,782,097; 2,795,487; 2,805,125; 2,874,028; and 2,895,800, and Parkash, "Residence Times of Crystals in a Fluidised Bed Crystallizer", *Chemistry and Industry*, pp. 919-920, Jun. 3, 1967; Parkash et al., "Crystal Growth in Fluidized Beds", *Indian Chemical Engineer*, pp. 3-6, January, 1968; Vragov, "Investigation of Ammonium Sulfate Crystallization in a Pseudo Liquified Layer", *Sb. Nauch, Tr., Kuzbas Politekh Int.*, No. 26, 1970; and, Postnikov et al., "Crystallization of Ammonium Sulfate in a Two-Circuit Device With a Circulating Suspension", *Koksii Khimiya*, No. 4, pp. 24-27, 1983.

It has long been recognized that the tendency of ammonium sulfate crystals to cake on standing is lessened with increased size of the crystals. It has therefore been a goal of many of these manufacturing processes to provide ammonium sulfate crystals of larger size, e.g., averaging at least about 1.0 mm. Typically, such increased crystal size has been achieved through control of the crystallization process.

SUMMARY OF THE INVENTION

It is a principal object of the invention to provide a process for increasing the average size of ammonium sulfate crystals thereby lessening the tendency of the crystals to cake during storage.

It is a particular object of the invention to provide such a process, and a suitable apparatus for its practice, in which growth in the size of ammonium sulfate crystals and subsequent drying of the enlarged crystals is achieved in a multi-stage operation with the feed crystals descending through the various stages of the operation against a countercurrent of heated gas, e.g., air.

In keeping with these and other objects, the present invention provides a process for increasing the average size of ammonium sulfate crystals which comprises:

a) spraying a feed of ammonium sulfate crystals with an aqueous ammonium sulfate solution such that a substantial number of individual ammonium sulfate feed crystals are contacted by the ammonium sulfate solution, the contact time of the crystals with the solution and the temperature of such contact being sufficient to result in enlarged ammonium sulfate crystals; and, b) heating the enlarged ammonium sulfate crystals to reduce their water content.

The invention further provides and ammonium sulfate crystal enlargement apparatus which comprises:

a) a first chamber for receiving a feed of ammonium sulfate crystals at one end and discharging enlarged ammonium sulfate crystals of relatively high water content at its other end;

b) means for spraying an aqueous ammonium sulfate solution into the first chamber such that a substantial number of individual ammonium sulfate feed crystals are contacted by the ammonium sulfate solution;

c) means for providing a current of gas in the first chamber which flows counter to the flow of ammonium sulfate crystals therethrough;

d) means for heating the ammonium sulfate feed crystals in the first chamber at least when such crystals are contacted with the ammonium sulfate solution such that the solution undergoes at least partial drying on the feed crystals resulting in enlarged ammonium sulfate crystals of relatively high water content:

e) a second chamber for receiving enlarged ammonium sulfate crystals of relatively high water content discharged from the first chamber at one end and discharging enlarged, dried ammonium sulfate crystals at the other end;

f) means for providing a current of gas in the second chamber which flows counter to the flow of enlarged ammonium sulfate crystals therethrough; and, g) means for heating the enlarged ammonium sulfate crystals in the second chamber to reduce the water content of the crystals.

DESCRIPTION OF THE PREFERRED EMBODIMENTS

Figure 1:
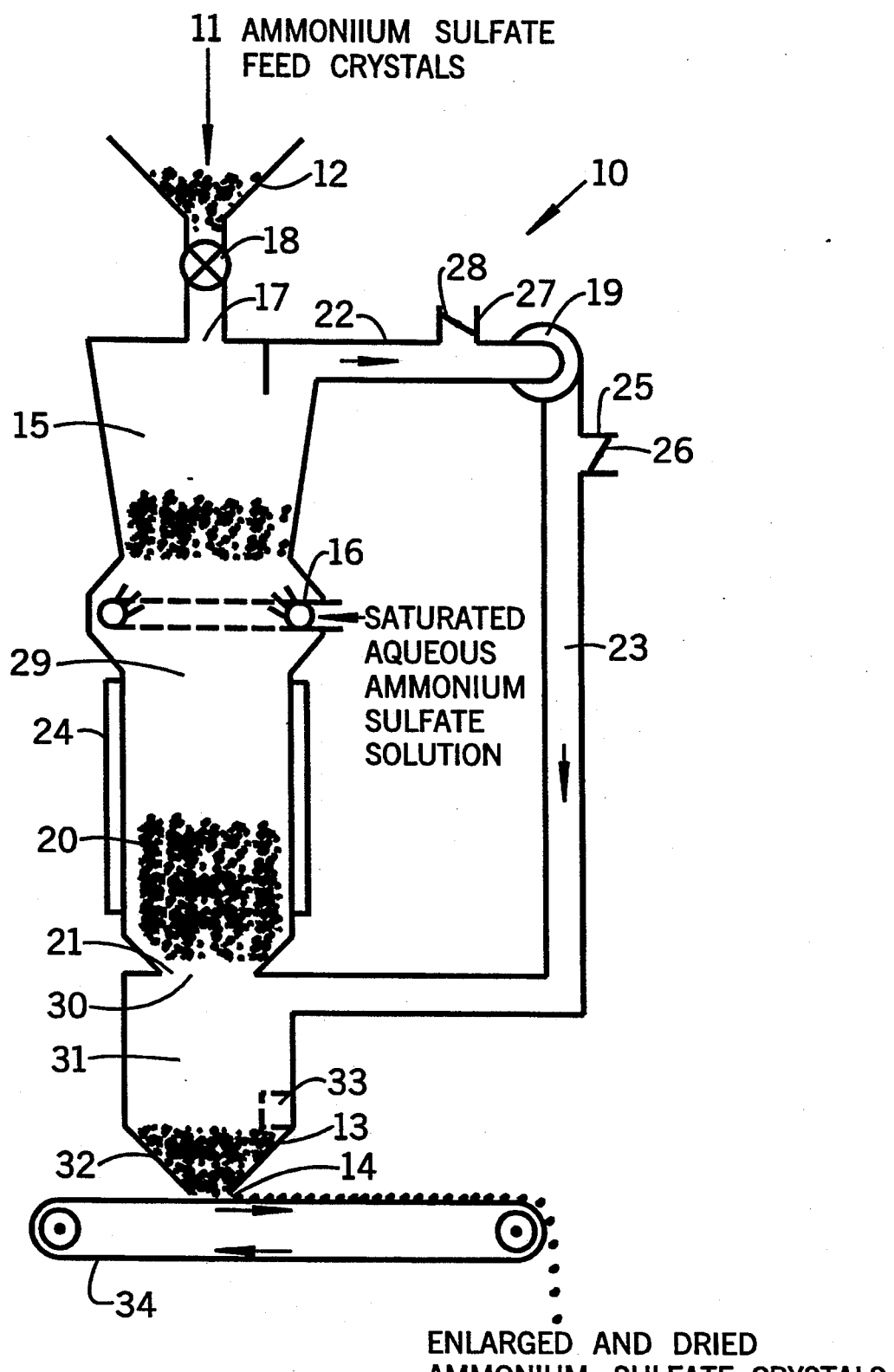
FIG. 1 is a diagrammatic side elevation view of an ammonium sulfate crystal enlargement apparatus in accordance with the invention.

As shown in FIG. 1, ammonium sulfate crystal enlargement apparatus 10 is provided as a triple-chambered vertical column with ammonium sulfate feed crystals 11 being introduced to the column from hopper 12 and enlarged and dried ammonium sulfate crystals 13 being discharged from the column at outlet 14. Apparatus 10 includes a first, or spray, chamber 15 in which enlargement of the feed crystals takes place. A saturated aqueous ammonium sulfate solution is introduced into chamber 15 through a ring-shaped spray header 16 which directs the droplets of ammonium sulfate solution upwardly against descending ammonium sulfate feed crystals 11 introduced to chamber 15 through inlet 17 controlled by inlet valve 18. The average residency time of the feed crystals in chamber 15 is controlled by suitably regulating the pressure of a countercurrent flow of gas, advantageously air, which is provided by blower 19. The countercurrent flow of gas is maintained in a continuous circuit, entering the bottom of second, or drying, chamber 20 through passage 21, passing upwardly through chambers 20 and 15 and thereafter through conduit section 22 where it is driven by blower 19 through conduit section 23, back into the bottom of second chamber 20, and so forth. The countercurrent flow of gas is heated at any suitable location along its circuit and by any suitable means, e.g., in the apparatus shown, by a steam jacket 24 surrounding second chamber 20. Relatively high moisture content gas can be vented from the apparatus as desired from conduit 25 controlled by valve 26 and make-up gas of relatively low moisture content can be admitted to the apparatus through conduit 27 controlled by valve 28.

As the feed crystals in chamber 15 accumulate additional ammonium sulfate from the saturated ammonium sulfate solution with which they are contacted, their apparent density increases to the point where they overcome the lifting force of the countercurrent gas flow which tends to maintain the feed crystals in suspension with the chamber, the result being that the by-now enlarged but relatively high moisture content ammonium sulfate crystals descend from chamber 15 through passage 29 into second chamber 20 where the countercurrent flow of heated gas retards the descent of the particles for a period of time sufficient to drive off a further quantity of moisture, substantially drying the crystals. The enlarged and dried ammonium sulfate crystals pass from chamber 20 through passage 30 (countercurrent flow gas inlet 21) into a third, or accumulator, chamber 31, preferably possessing a conical lower section 32 in which a mass of enlarged, dried ammonium sulfate crystals 13 accumulates. This accumulation of crystals prevents a leakage of pressurized countercurrent gas from apparatus 10. An ammonium sulfate crystal level sensor 33 is advantageously provided in chamber 31 to monitor the level of the accumulated product crystals therein and thus assure the presence of at least an amount of product crystals which will resist or prevent any significant leakage of countercurrent gas from the apparatus. When the mass of accumulated product crystals falls below a predetermined level, as would be the case where the rate of withdrawal of product crystals from chamber 31 exceeds the supply of enlarged, dried crystals thereto from chamber 20, the sensor generates a control signal temporarily reducing the speed of product crystal recovery belt 34 until the desired level of product crystal in conical section 32 is once again attained. Similarly, level sensor 33 functions to prevent excessive accumulation of product crystals in chamber 31 by increasing the speed of belt 34 thus withdrawing, product crystals 13 at a faster rate, until the desired level of the crystals in conical section 32 of chamber 31 is again achieved. The invention contemplates the use of known and conventional level sensor units with their attendant signal generating, processing and control devices.

The specific operational parameters of the ammonium sulfate crystal enlargement process herein can vary widely and are not particularly critical. Optimization of these parameters can be achieved for a specific size, shape and density of ammonium sulfate feed crystals and desired level of enlargement and dryness in the product crystals employing simple and routine experimentation. In the case of feed crystals possessing an average size of from about 0.21 to about 0.42 mm, i.e., crystals which are generally regarded to be undersized, the process and apparatus of this invention can readily be operated to provide product crystals of at least 1.0 mm, and preferably of at least about 1.3 mm, with a residual moisture content not exceeding about 5 and preferably not exceeding about 1 weight percent. In one particular crystal enlargement operation, the velocity of countercurrent gas can be such as to provide a pressure of from about 0.15 to about 0.20 and preferably from about 0.16 to about 0.18 psig in first chamber 15 and a pressure of from about 0.33 to about 0.39 and preferable from about 0.35 to about 0.37 psig in second chamber 20. Such pressures are generally sufficient to retard the rate of descent of the ammonium sulfate crystals in these chambers so that the crystals remain resident in chambers 15 and 20 for appropriate periods of time, i.e., in chamber 15 until the feed crystals have increased to a predetermined average size and in chamber 20 until the enlarged crystals have been dried to a predetermined maximum level of retained moisture. The temperatures within chambers 15 and 20 are likewise regulated by the heating means, e.g., steam jacket 24, to achieve evaporation of water from the wetted crystals in chamber 15 and suitable drying of the crystals in chamber 20 to provide product crystals 13 in chamber 31. Thus, e.g., temperatures of the countercurrently flowing gas in chamber 15 can vary from about 95° to about 115° and preferably from about 100° to about 110° C. and in chamber 19 can vary from about 110° to from about 125° C. and preferably from about 110° to about 115° C. Depending on the size of apparatus 10, throughputs on the order of from about 100 to about 1000 and preferably from about 500 to about 700 pounds per hour can be readily obtained.

What is claimed is:

1. An ammonium sulfate crystal preparation apparatus which comprises:
  a) a first chamber possessing an upper zone into which there is introduced a feed of ammonium sulfate crystals and a lower zone from which there is discharged uniformly sized ammonium sulfate crystals of relatively high water content;
  b) means for spraying an aqueous ammonium sulfate solution into the first chamber such that individual ammonium sulfate feed crystals are contacted by the ammonium sulfate solution;
  c) a second chamber possessing an upper zone into which there is introduced uniformly sized ammonium sulfate crystals of relatively high water content discharged from the lower zone of the first chamber and a lower zone through which there is discharged dried ammonium sulfate crystals;
  d) means for providing a current of gas in the second chamber which flows counter to the flow of ammonium sulfate crystals therethrough;
  e) means for heating the ammonium sulfate crystals in the second chamber to reduce the water content of the crystals;
  f) means for passing sufficient countercurrent gas flow through the second chamber and into the first chamber, such that crystals in the first chamber are suspended until the crystals grow to a size and density sufficient to overcome the countercurrent gas flow; and,
  g) a third chamber possessing an upper zone into which there is introduced dried ammonium sulfate crystals of reduced water content discharged from the lower zone of the second chamber and a lower zone from which dried, ammonium sulfate crystals are discharged, the third chamber possessing means for preventing significant leakage of the gas from the apparatus as the dried ammonium sulfate crystals are discharged from the lower zone of said chamber;
  the first, second and third chambers being arranged in a vertical column with the first chamber at the top of the column, the third chamber positioned at the bottom of the column and the second column positioned between the first and third chambers.

2. The apparatus of claim 1 further comprising:
  h) a third chamber for receiving enlarged, ammonium sulfate crystals of reduced water content discharged from the second chamber at one end, accumulating a sufficient mass of such crystals to prevent significant leakage of the gas from the apparatus and discharging enlarged, ammonium sulfate crystals of reduced water content at the other end.

3. The apparatus of claim 2 further comprising:

i) conveying means for transferring enlarged ammonium sulfate crystals of reduced water content away from the third chamber.

4. The apparatus of claim 3 further comprising:

j) sensing means for determining the level of accumulated enlarged ammonium sulfate crystals of reduced water content present in the third chamber such that when said level exceeds or falls below a predetermined limit, a signal generated by the sensing means causes the conveying means to operate at a faster or slower rate as required to restore the level of accumulated crystals to within the predetermined limit.

5. The apparatus of claim 2 wherein the first, second and third chambers are arranged in a vertical column with the first chamber at the top of the column, the third chamber positioned at the bottom of the column and the second chamber positioned between the first and third chambers.

6. The apparatus of claim 5 wherein the flow of gas is maintained in a circuit with gas being transferred from the first chamber to the bottom of the second chamber and upwardly through the second and first chambers.

7. The apparatus of claim 6 wherein the flow of gas is maintained by a blower.

8. The apparatus of claim 6 wherein the gas is heated.

9. The apparatus of claim 6 wherein the gas is heated by heating means associated with the second chamber.

10. The apparatus of claim 9 wherein the heating means is a steam jacket surrounding the second chamber.

11. The apparatus of claim 6 including means for venting relatively high moisture content gas from the circuit and means for introducing relatively low moisture content gas to the circuit.

* * * * *